July 29, 1930.  L. LARSON ET AL  1,771,642
TIRE SCRAPER
Filed Oct. 17, 1928
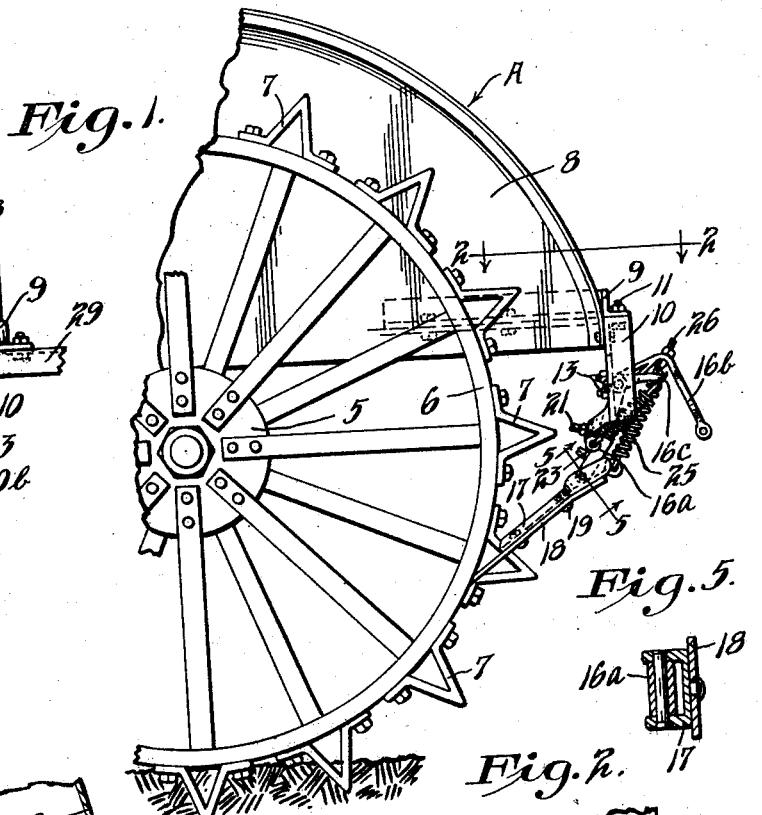
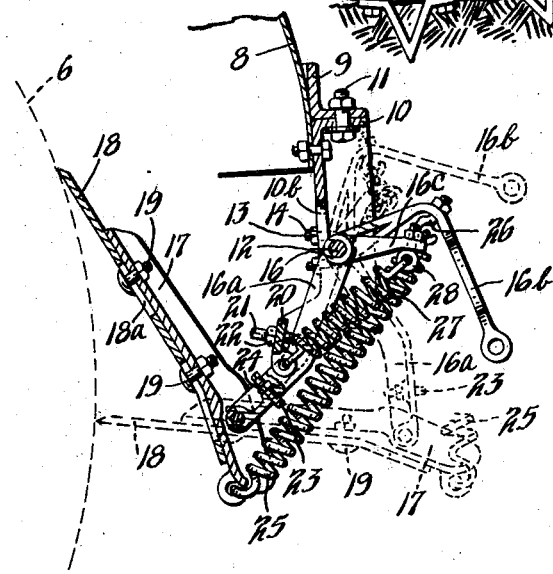
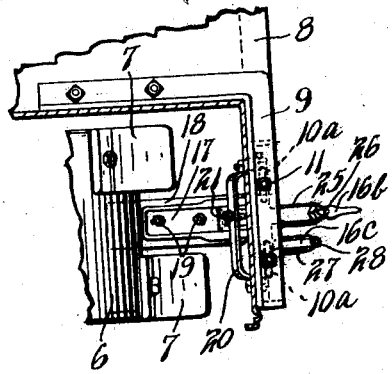
Inventor
Louis Larson
Dan M. Larson
By their Attorneys Patented July 29, 1930

1,771,642

UNITED STATES PATENT OFFICE

LOUIS LARSON AND DANIEL MILTON LARSON, OF HANNAFORD, NORTH DAKOTA

TIRE SCRAPER

Application filed October 17, 1928. Serial No. 313,034.

This invention relates to devices for scraping mud, dirt and snow from the tires of vehicle wheels, and relates particularly to scrapers for the tires of bull wheels on tractors.

It is an object of this invention to provide a novel and improved scraper for the tires of vehicles which will efficiently scrape mud, snow, etc., from the tires, but which when an unusually hard obstruction is carried upwardly on a tire, will yield to permit the free passage of the hard obstruction past the scraper without danger of breakage of the scraper, or injury to the parts of the vehicle to which the scraper is connected.

It is a further object of the invention to provide certain improvements on our previous invention on scraper for vehicle tires upon which we filed an application for U. S. patent on February 13, 1928, S. N. 253,987.

To these ends, the invention consists in the novel parts and novel combinations of parts, hereinafter defined in the claims, and described in the following specification, made in connection with the accompanying drawings, wherein like reference characters refer to the same or similar parts throughout the various views and, in which, Fig. 1 is a view in side elevation of a portion of a tractor equipped with one of the scrapers of the present invention, the movable parts of the scraper being illustrated in working position;

Fig. 2 is a horizontal section taken on the line 2—2 of Fig. 1 as is indicated by the arrow;

Fig. 3 is a view in rear elevation of the device as illustrated in Fig. 1, the wheel of the tractor not being shown;

Fig. 4 is a vertical section on an enlarged scale taken on the line 4—4 of Fig. 3, as is indicated by the arrows, but illustrating the movable parts of the device in dotted lines in central position and in full lines in upwardly raised position, the tractor wheel being indicated by dotted lines, and Fig. 5 is a section taken in an enlarged scale on the line 5—5 of Fig. 1, as is indicated by the arrows.

Referring to the drawings, portions of a tractor A are illustrated which include a bull wheel 5 having a tire 6 provided with two rows of laterally spaced ground engaging lugs 7 thereon. A mud guard for the tractor is designated by the numeral 8, and a cross frame member which runs between the rear ends of the mud guards is designated by the numeral 29. During the operation of the tractor in the fields, or on ice or snow, the outer surface of the tire 6 will become clogged with dirt, or snow, and this will seriously impede the traction obtained by the wheels of the tractor. When ground engaging lugs, such as the lugs 7, are used on the wheels, the dirt and snow clinging to the tire 6 will shorten the active length of the lugs 7 and thereby materially reduce the pulling power of the tractor, causing the wheels to skid, dig troughs in the ground and thus prevent the tractor from working to its utmost efficiency, as well as injuring the ground over which the tractor travels. It is, therefore, desirable to provide a scraper which will scrape off the mud and snow on the tire of a wheel of the tractor as the dirt and snow is picked up. This was the purpose of our invention described and claimed in the above identified application for patent. It was found, however, that in using the device of said invention, occasionally a hard obstruction such as a rock or a piece of metal would be picked up by the tire of the tractor which could not be removed by use of the scraper and would, accordingly, either break the scraper or bend the portion of the tractor to which the scraper was secured. The present construction is devised to obviate any possibility of breakage of the scraper or of injury to the portion of the tractor to which the scraper is secured.

In accordance with the present invention, a suitable angle bracket 9 formed from angle iron is provided and this bracket is horizontally secured to the lower rear end of the mud guard 8, so that one arm of the angle bracket extends transversely of the mud guard and the other arm thereof extends along the inner side of the mud guard. Bolted or otherwise secured to the arm of the angle bracket 9 extending transversely of the mud guard, is a U-shaped frame 10 provided with outer flanges to strengthen the same. If desired, slots 10ª may be provided on the top flange of the frame 10 through which bolts 11 securing the frame to the bracket 9 extend, and it will thus be seen that lateral adjustment of the frame 10 relative to the mud guard 8 can be made. Pivoted at one end to one arm of the frame 10 is a shaft 12 which normally extends transversely of the frame and has its other end fitted within a U-clip 13 projecting through a slot 10ᵇ on the other arm of the bracket 10. The U-clip 13 carries nuts 14 at the inner ends thereof, and these nuts are tightened against the inner side of the frame 10 to tightly secure the swingable end of the shaft 12 in place on the frame. It will be noted that with this construction, the shaft 12 may always be mounted in a true horizontal plane irrespective of whether the rear end of the mud guard 8 is exactly horizontally disposed or not. Journaled on the shaft 12 and held from lateral movement thereon by pins 15 is a bell crank lever 16 having preferably three arms 16ª, 16ᵇ and 16ᶜ. The arm 16ª projects downwardly from the shaft 12 and has pivoted thereto a scraper blade holder 17. The scraper blade holder 17 is preferably constructed of channel-shape to give the same rigidity and it is pivoted to the lower end of the arm 16ª intermediately from the two ends thereof. A scraper blade 18 having a beveled and sharpened working end is secured to the blade holder 17 by means of nutted bolts 19 which project through holes in the blade holder 17, and through longitudinal slots 18ª in the blade 18. The slots 18ª will permit the blade 18 to be adjusted longitudinally on the blade holder 17. Extending between the lower ends of the arms of the U-shaped frame 10 and projecting forwardly therefrom is a bar 20 having mounted thereon a stud 21 at the central portion thereof, which is screw threaded into the bar 20. The stud 21 is so placed that when the lower end of the arm 16ª of bell crank lever 16 is forwardly swung, the rear end of the stud 21 will engage the edge of the arm 16ª and act as a stop to limit the forward swinging movement thereof. By adjustment of the stud 21 in the bar 20, the forward movement of the arm 16 can be variably limited. A lock nut 22 on the stud 21 is provided to hold the stud in the desired adjusted position. The bar 20 and stud 21, accordingly, form an adjustable stop for limiting the forward swinging movement of the arm 16ª. A stud 23 screw threaded into the arm 16ª adjacent the lower end thereof, and projecting rearwardly from the arm, will act against the upper end of the blade holder 17 as illustrated in Fig. 1, to limit the upwardly swinging movement of the upper end of the blade holder. The stud 23 is adjustable in the arm 16ª and is adapted to be held in any desired adjusted position by means of a lock nut 24.

The arm 16ᵇ of bell crank lever 16 is of angular shape, projects generally upwardly from the arm 16ª and has an opening at its outer end through which a rope or cable may be passed if desired. A heavy coiled tension spring 25 is secured at one end to an eye formed at the upper end of the blade holder 17, as illustrated in Fig. 1, and it is secured at its other end to a hook 26 mounted on the arm 16ᵇ at the angular portion thereof. The spring 25 is normally under tension to hold the upper end of the blade holder 17 against the stop stud 23, so that the blade 18 projects downwardly at a rearwardly and upwardly inclined angle to the ground in the proper position for engagement with the tire 6 of the wheel 5 of the tractor. The arm 16ᶜ of bell crank lever 16 projects generally rearwardly from the arm 16ª and a heavy coiled tension spring 27 is secured at one end to an eye 28 mounted in the outer end of the arm 16ᶜ, and the spring 27 is secured at its other end to an eye formed on the bar 20. The spring 27 is normally under tension to swing the arm 16ª of the bell crank lever upwardly and against the stop stud 21. The outer portion of the arm 16ᵇ will form a handle, whereby the bell crank lever 16 can be grasped to swing the arm 16ª of the same rearwardly and against the tension of the two springs 25 and 27.

In assembling the device on the tractor, having a bull wheel provided with spaced lugs 7, the frame 10 will be so set on the angle bracket 8 that the scraper blade will extend between the two rows of spaced lugs on the wheel. The shaft 12 will be so adjusted that it extends substantially horizontally, while the stop studs 21 and 23 will be so adjusted in the bar 20 and in the arm 16ª respectively, that the scraper blade 18 will normally extend substantially tangentially to the tire 6 of the wheel 5 and will extend in a direction opposing the movement of the wheel as the tractor moves forwardly. The blade 18 will be adjusted on the blade holder 17, so that the beveled end thereof either strikes the tire 6, or is spaced very close thereto.

With the parts of the device positioned and adjusted, as above described, it will be seen that as the tractor moves forwardly the blade 18 will engage or almost engage the tire 6 between the rows of spaced lugs 7 thereon, to scrape any dirt, snow or other accumulations from the tire that may accumulate thereon. If a stone, a piece of iron, or some other unusually hard obstruction should be caught on the tire of the wheel, so that it could not be scraped off by the scraper, the two springs 25 and 27 will permit the blade to yield to permit the passage of the hard obstruction past the blade as the hard obstruction strikes the same. As the blade 18 is normally set when in working position in a downwardly extending tangential position relative to the tire 6, the forward end of the blade will be first carried upwardly and rearwardly, thereby causing the arm 16ª of the bell crank lever to be swung against the tension of spring 27 rearwardly from its normal position engaging the stud 21. At the same time, the normally upper end of the blade holder 17 will be swung downwardly against the tension of the spring 25. When the blade 18 has been moved against the tension of the two springs 25 and 27 until the blade is directed toward the hub of the wheel 5, the movable parts will assume the position illustrated in dotted lines Fig. 4, and the two springs 25 and 27 will be expanded to their greatest extent. From the position of the parts illustrated in dotted lines Fig. 4, the obstruction on the tire of the wheel 5 will force the movable parts to the position illustrated in full lines Fig. 4. During this movement, the tension on the spring 27 will be relaxed until the arm 16ª of bell crank lever 16 has been swung forwardly to abut the stop stud 21. As the blade 18 swings past the high point on the wheel, the normally lower portion of the blade 18 and the blade holder 17 will be swung upwardly, thereby still retaining the spring 25 in stretched position under considerable tension. In the position illustrated in full lines Fig. 4, the blade 18 is set so that it extends substantially tangentially to the tire 6, but the blade is directed towards the direction of rotation of the wheel in its forward movement. Accordingly, the obstruction on the wheel will slip past the blade merely causing the active end of the blade to swing outwardly from the tire 6 sufficiently to permit passage of the obstruction. To return the scraper to its normal working position, the handle portion of arm 6ᵇ will be grasped and will be swung upwardly against the tension of the two springs 25 and 27, thereby causing the springs to force the blade 18 and blade holder 17 downwardly to the normal working position as illustrated in Fig. 1. The return of the blade to working position can also be accomplished by merely reversing the tractor, thereby reversing the direction of rotation of the wheel 5.

The springs 25 and 27 are strong and stiff and it will, accordingly, require a very hard obstruction on the tire before the springs will yield sufficiently to permit the blade 18 to be swung upwardly. A very effective scraping action of the tire, therefore, results and yet there is no danger that the blade 18 or other parts of the device will become broken, or that the mud guard 8 will become bent as a hard obstruction is carried upwardly against the blade 18. Although the device is particularly adapted for use in connection with the bull wheels of tractors having rows of ground engaging lugs thereon, the device can equally as well be applied to vehicles of other types wherein tires are used with or without ground engaging lugs. With the present construction, it will be noted that the normal working position of the blade 18 can be almost universally adjusted. The device has been demonstrated in actual practice and has been found to be very successful and efficient for the purposes described.

It will, of course, be understood that various changes may be made in the form, details, arrangement and proportions of the parts without departing from the scope of the present invention.

What is claimed is:

1. The combination with the tire on the wheel of a vehicle, of a stop member secured to a fixed portion of the vehicle in spaced relation from the tire, a lever pivoted to a fixed portion of the vehicle and adapted to strike said stop member when the lower end thereof is forwardly swung, a scraper pivoted to the lower end of said lever, resilient means secured at one end to said stop member and at its other end to a portion of said lever to normally force the same towards said stop member, resilient means secured to a portion of said lever and to said scraper to normally force the scraper against said tire, whereby said scraper will normally act to scrape dirt from said tire, but as an unusually hard obstruction on said tire strikes said scraper, said scraper will swing upwardly about its pivot and said lever will swing rearwardly to permit the hard obstruction to be carried past said scraper.

2. The combination with a tire on the wheel of a vehicle, of a frame member secured to said vehicle, a bell crank lever pivoted in said frame member, a stop limiting the upward movement of the lower portion of said lever, a spring acting between said lever and said stop to normally hold the lower portion of said lever against said stop, a scraper intermediately pivoted to the lower end of said lever, said scraper opposing said tire, a spring acting between a portion of said lever and a portion of said scraper and normally forcing said scraper against said tire, whereby said scraper will normally scrape foreign material from said tire, but as an unusually hard obstruction caught on said tire strikes said scraper, said scraper and said lever will pivot to permit said scraper to be carried upwardly on said tire to allow the obstruction to pass the scraper.

3. The combination with a tire on the wheel of a vehicle, of a stop member secured to a fixed portion of the vehicle in spaced relation from the tire, a lever pivoted to a fixed portion of the vehicle and adapted to be limited in its movement by said stop member when the lower end of the lever is swung forwardly toward the tire, a scraper pivoted to the lower end of said lever, resilient means urging the lower end of said lever towards said stop member, resilient means urging said scraper to swing downwardly about its pivot away from said tire, and stop means adapted to limit the movement of said scraper in a direction away from said tire to normally hold the scraping edge of the scraper closely adjacent said tire, whereby said scraper will normally act to scrape dirt from said tire, but as an unusually hard obstruction on said tire strikes said scraper, said scraper will swing upwardly about its pivot and said lever will swing rearwardly to permit the hard obstruction to be carried past said scraper.

4. The combination with a tire on the wheel of a vehicle, of a lever pivoted at one portion thereof to a fixed portion of said vehicle opposite said tire, a scraper intermediately pivoted to the lower end of said lever, resilient means acting on said lever to urge the lower end thereof toward said tire, a tension spring secured at one end to said scraper and at its other end to said lever and urging the upper end of said scraper into engagement with said lever to hold the lower portion of said scraper in scraping position adjacent said wheel, said resilient means and spring permitting said scraper and lever to yield as an unusually hard obstruction on the tire strikes the scraper to permit the obstruction to be carried past the scraper.

5. The combination with a tire on the wheel of a vehicle, of a bell crank lever pivoted to a fixed portion of the vehicle opposite said tire, a scraper intermediately pivoted to one arm of said bell crank lever, resilient means urging said arm of the bell crank lever toward the tire, a spring secured at one end to said scraper and at its other end to said lever, and urging one portion of said scraper into contact with said arm to normally hold another portion of said scraper closely adjacent the tire in scraping relation and a handle secured to said bell crank lever, whereby said scraper will act to scrape said vehicle tire, but as an unusually hard obstruction caught on the tire strikes the scraper, the scraper will yield and be carried with the tire until the hard obstruction passes the scraper, said handle being adapted to be used to swing said lever to return said scraper to its normal position.

6. The combination with a tire on the wheel of a vehicle, of a three arm bell crank lever pivoted to a fixed portion of said vehicle opposite the tire, a scraper intermediately pivoted to one arm of said bell crank lever, a tension spring secured at one end to a fixed portion of the vehicle and at its other end to a second arm of said bell crank lever and normally forcing the first arm of said lever towards the tire, a second tension spring secured at one end to the third arm of said bell crank lever and at its other end to one end of said scraper and urging the said end of said scraper into engagement with said first mentioned arm of said bell crank lever, to normally hold the other end of said scraper in scraping relation adjacent the tire, said third arm of the bell crank lever forming a handle for swinging said lever, whereby said scraper will act to scrape dirt from said tire and as an unusually hard obstruction caught on the tire strikes said scraper, said scraper and lever will yield to permit the hard obstruction to be carried past the scraper.

In testimony whereof we affix our signatures.

LOUIS LARSON.
DANIEL MILTON LARSON.